United States Patent
Ohishi et al.

(10) Patent No.: US 7,427,114 B2
(45) Date of Patent: Sep. 23, 2008

(54) BRAKE FLUID PRESSURE CONTROL UNIT FOR VEHICLE

(75) Inventors: Yuji Ohishi, Kanagawa (JP); Hikaru Morita, Kanagawa (JP); Chiharu Nakazawa, Kawasaki (JP); Daisuke Hiwatashi, Kanagawa (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/131,595

(22) Filed: Apr. 25, 2002

(65) Prior Publication Data

US 2002/0171286 A1 Nov. 21, 2002

(30) Foreign Application Priority Data

Apr. 25, 2001 (JP) ............................. 2001-127632
Mar. 18, 2002 (JP) ............................. 2002-074048

(51) Int. Cl.
*B60T 8/36* (2006.01)

(52) U.S. Cl. ................... 303/119.2; 303/119.3

(58) Field of Classification Search .......... 303/DIG. 10, 303/DIG. 8, DIG. 11, 87, 119.1, 119.2, 119.3; 403/282

See application file for complete search history.

(56) References Cited

U.S. PATENT DOCUMENTS

| | | | |
|---|---|---|---|
| 1,928,443 | A | 9/1933 | Archer et al. |
| 3,825,146 | A | 7/1974 | Hirmann |
| 3,952,395 | A | 4/1976 | Crossman et al. |
| 4,095,327 | A | 6/1978 | Hartmann |
| 4,610,267 | A | 9/1986 | Beck et al. |
| 5,187,626 | A | 2/1993 | Hopkins et al. |
| 5,244,262 | A * | 9/1993 | Kehl et al. ............... 303/119.3 |
| 5,324,134 | A * | 6/1994 | Kaes et al. ............... 403/282 |
| 5,460,350 | A * | 10/1995 | Nagashima et al. .... 251/129.15 |
| 5,460,438 | A | 10/1995 | Hellmann et al. |
| 5,577,813 | A | 11/1996 | Zaviska |
| 5,718,489 | A * | 2/1998 | Megerle et al. .......... 303/119.2 |
| 5,771,425 | A | 6/1998 | Yamada et al. |
| 5,857,753 | A | 1/1999 | Gowda |
| 5,907,750 | A | 5/1999 | Yamada et al. |
| 5,984,263 | A | 11/1999 | Hosoya |
| 6,102,495 | A | 8/2000 | Zaviska |
| 6,145,543 | A | 11/2000 | Ohishi et al. |
| 6,199,959 | B1 | 3/2001 | Beck et al. |

(Continued)

FOREIGN PATENT DOCUMENTS

DE 42 02 905 A1 8/1993

(Continued)

OTHER PUBLICATIONS

Ohishi, Y., et al., U.S. Appl. No. 10/127,696, filed Apr. 23, 2002, pp. 6 (office action dated Jul. 28, 2004).

(Continued)

*Primary Examiner*—Pam Rodriguez
(74) *Attorney, Agent, or Firm*—Foley & Lardner LLP (57) ABSTRACT

A vehicular brake fluid pressure control unit includes a base block of aluminum material having a cylinder bore containing a piston and a return spring, and a cover member fixed to the base block to cover an open end of the cylinder bore. The cover member is formed with a vent hole opening into an atmospheric chamber in the cover member, and made of aluminum. material.

55 Claims, 10 Drawing Sheets

U.S. PATENT DOCUMENTS

| | | |
|---|---|---|
| 6,203,117 B1 | 3/2001 | Starr et al. |
| 6,223,647 B1 * | 5/2001 | Plantan et al. ............... 92/63 |
| 6,270,170 B1 | 8/2001 | Isogai et al. |
| 6,360,778 B1 | 3/2002 | Vennemeyer et al. |
| 6,390,133 B1 | 5/2002 | Patterson et al. |
| 6,398,315 B1 * | 6/2002 | Dinkel et al. ............ 303/113.1 |
| 6,472,769 B1 * | 10/2002 | Long et al. ................ 307/9.1 |
| 6,536,983 B1 * | 3/2003 | Morefield ................. 403/278 |
| 6,979,063 B2 | 12/2005 | Ohishi et al. |
| 7,249,808 B2 | 7/2007 | Ohishi et al. |
| 2002/0140284 A1 | 10/2002 | Koyama |
| 2002/0171287 A1 | 11/2002 | Ohishi et al. |

FOREIGN PATENT DOCUMENTS

| | | |
|---|---|---|
| DE | 195 00 350 A1 | 7/1996 |
| DE | 195 47 541 A1 | 6/1997 |
| DE | 197 00 495 A1 | 7/1997 |
| DE | 199 18 575 A1 | 12/1999 |
| DE | 198 46 379 A1 | 4/2000 |
| GB | 2 263 753 A | 8/1983 |
| JP | 11-139285 A | 5/1999 |
| JP | 11-321608 A | 11/1999 |
| JP | 2001-328526 A | 11/2001 |
| JP | 2001-523611 A | 11/2001 |
| JP | 2002-200972 A | 7/2002 |
| JP | 2002-283988 A | 10/2002 |
| WO | WO 97/06037 A1 | 2/1997 |
| WO | 99/25594 | 5/1999 |

OTHER PUBLICATIONS

Ohishi, Y., et al., U.S. Appl. No. 10/127,696, filed Apr. 23, 2002, pp. 6 (office action dated Jan. 1, 2004).

* cited by examiner

PRIOR ART

US 7,427,114 B2

BRAKE FLUID PRESSURE CONTROL UNIT FOR VEHICLE

BACKGROUND OF THE INVENTION

The present invention relates to a vehicular brake fluid pressure control unit to be mounted on a vehicle, as component of an onboard system such as an anti-lock brake control system, a vehicle behavior control system and a traction control system.

Published International Application Publication No. WO99/25594 shows a brake fluid control unit for a vehicle.

SUMMARY OF THE INVENTION

It is an object of the present invention to provide a brake fluid pressure control unit advantageous in compactness or manufacturing cost or durability.

According to one aspect of the present invention, a brake fluid pressure control unit for a vehicle, comprises: a base block of aluminum material, formed with a cylinder bore extending from a bottom end to an open end; a piston received slidably in the cylinder bore and shaped to divide the inside of the cylinder bore into a fluid chamber and an atmospheric chamber; a bias member disposed between the piston and a cover member, and arranged to urge the piston toward the bottom end of the cylinder bore; and the cover member fixed to the base block to cover the open end of the cylinder bore, formed with a vent hole opening into the atmospheric chamber, and made of aluminum material.

The other objects and features of this invention will become understood from the following description with reference to the accompanying drawings.

DETAILED DESCRIPTION OF THE INVENTION

Figure 10:
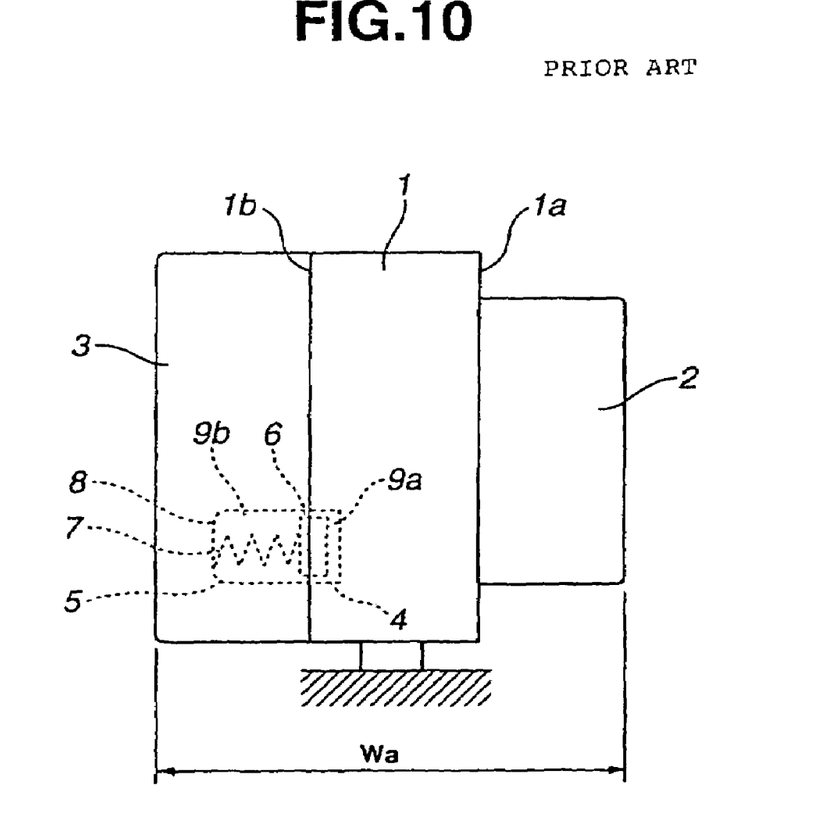
FIG. 10 is a side view showing a brake fluid pressure control unit of a related technology.

To facilitate understanding the present invention, reference is first made to FIG. 10 showing a brake fluid pressure control unit of a related art. The brake pressure control unit shown in FIG. 10 includes a base block 1 having opposite faces 1a and 1b, a pump driving motor 2 mounted on the first face 1a, and an electronic board block 3 mounted on the second face 1b, for controlling electronic components such as an electromagnetic valve. Base block 1 is formed with a cylinder bore 4 closed by a cover member 5 to form a reservoir 8. Reservoir 8 includes a piston 6 and a biasing member or return spring 7, and acts to store brake fluid temporarily. Cover member 5 made of an iron-base metallic material projects laterally from base block 1, and piston 6 is slidably received in a cylindrical hole of cover member 5 in a manner to divide the inside cavity into a liquid chamber 9a and an atmospheric chamber 9b.

However, this unit is susceptible to electrolytic corrosion or galvanic corrosion around the interface between base block 1 of aluminum and cover member 5 of iron-base alloy specifically with the aid of air (oxygen) or electrolyte such as brake fluid. Therefore, cover member 5 is further encased with a cover of electric board block 3.

Moreover, the cover member 5 projecting laterally is detrimental in some cases to the space for accommodating motor 2 or electric board block 3. The protection of reservoir 8 against rain water and brake fluid is not so easy without an additional protection specific for reservoir 8, and the reciprocating motion of piston 6 tends to suck air and fluid into cover member and to promote corrosion.

FIGS. 1~6 show a brake fluid pressure control unit according to one embodiment of the present invention. This brake fluid pressure control unit is resistant to corrosion and advantageous in size reduction and cost reduction. In this embodiment, the brake pressure control unit is a component unit of an anti-lock brake control system for a vehicle. The brake pressure control unit shown in FIG. 1 includes a base block 11, a pump driving motor 12 and an electronic board block 13 for controlling electronic components. Base block 11 is sandwiched between motor 12 and board block 13. Base block 11 has first and second opposite base faces 11a and 11b. Motor 12 is fixed to the first base face 11a, and electronic circuit board block 13 is fixed to the second base face 11b.

Figure 1:
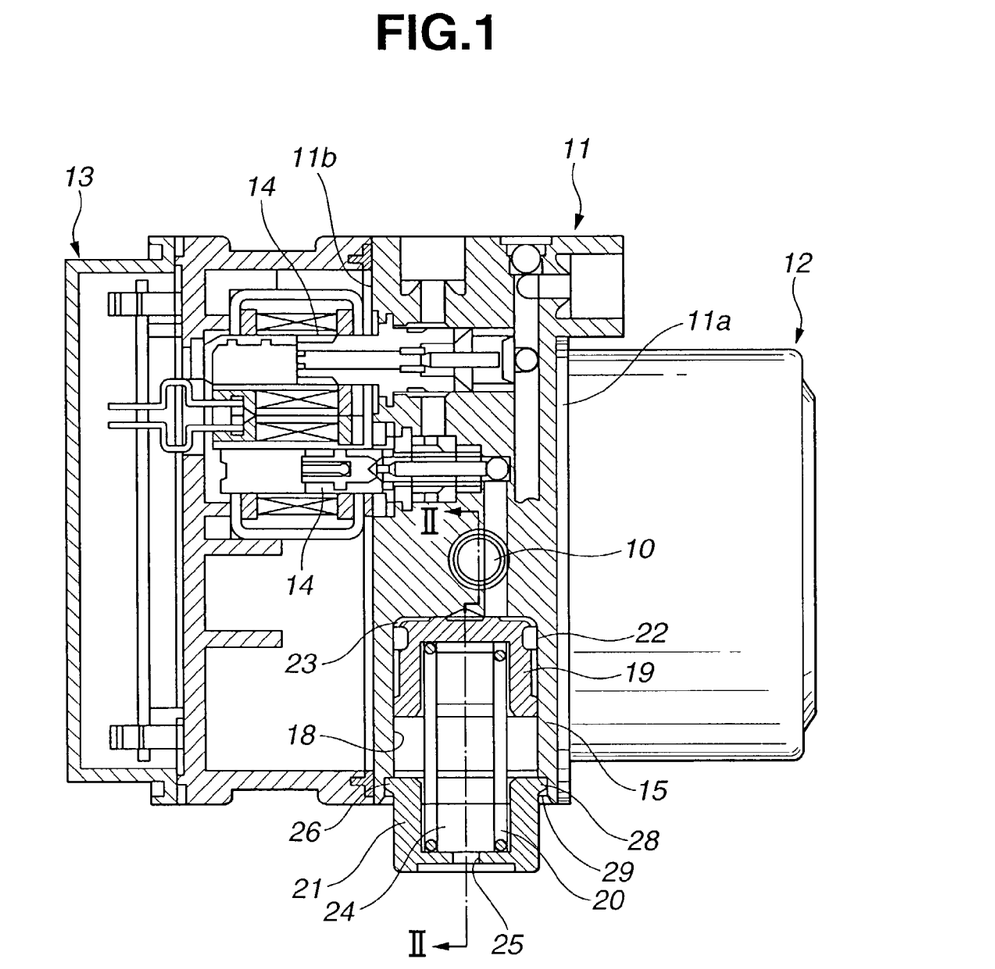
FIG. 1 is a vertical sectional view of a brake fluid pressure control unit according to one embodiment of the present invention.
Figure 2:
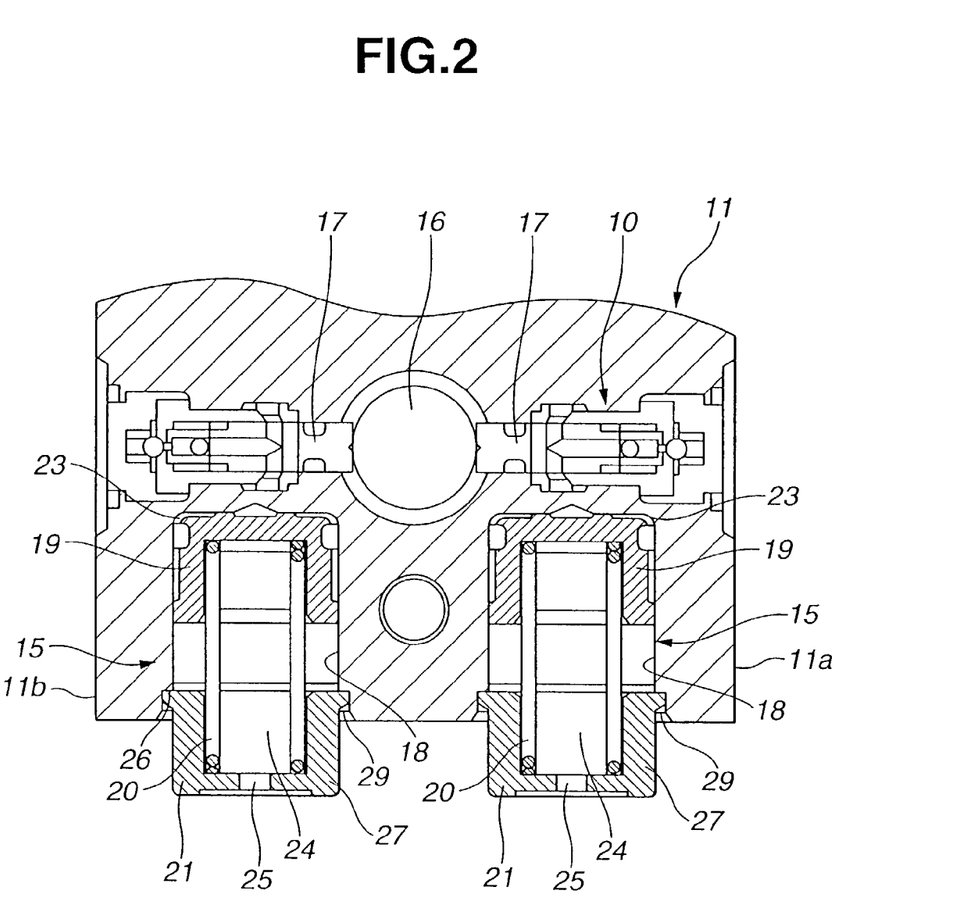
FIG. 2 is a sectional view of the brake fluid pressure control unit of FIG. 1, taken across a line II-II.

Base block 11 is connected with piping on a master cylinder side and piping on a wheel cylinder, and configured to control a fluid pressure on the wheel cylinder side with a hydraulic circuit in base block 11. In the example of FIG. 1, the fluid pressure control unit controls the pressure in a wheel cylinder to increase, hold and re-increase the pressure in accordance with a wheel slipping condition with a solenoid valve 14 extending from base block 11 into electronic board block 13. In the hydraulic circuit of base block 11, there are provided a pair of reservoirs 15 for storing the operating fluid temporarily. From each reservoir 15, the operating fluid is returned to the master cylinder appropriately by the action of pump 10. Pump 10 of this example is a plunger pump having an eccentric cam 16 rotated by motor 12 for reciprocating a plurality of plungers 17, as shown in FIG. 2.

Base block 11 according to this embodiment is an aluminum block made of aluminum material. When installed in a vehicle, base block 11 is placed upright as shown in FIG. 1 so that the upper side of base block 11 shown in FIG. 1 is located at an upper position, and the lower side of base block 11 as viewed in FIG. 1 is at a lower position.

A pair of cylinder bores 18 are formed in base block 11. In this example, cylinder bores 18 extend side by side vertically from the lower side toward the upper side in parallel to each other. Cylinder bores 18 are spaced from each other, as shown in FIG. 2, in widthwise direction perpendicular to a thickness direction of a thickness defined between first and second faces 11a and 11b. Each cylinder bore 18 extends from a closed upper end (or bottom end) to an open lower end opening in a lower outside surface 11c of cylinder block 11. In each cylinder bore 18, there are provided a piston 19 slidable in the cylinder bore 18, and a coil spring 20 serving as a bias member to urge the piston 19 toward the bottom end of the cylinder bore 18. The open lower end of each cylinder bore 18 is covered by a cover member 21 fixed to the lower side of base block 11. In this example, each cover member 21 is made of the aluminum material of cylinder block 11.

The inside cavity of each cylinder bore 18 is divided into a fluid or liquid chamber 23 and an atmospheric chamber 24 by the piston 19 having a seal ring 22 around the outer circumference. The fluid chamber 23 formed between the bottom end of cylinder bore 18 and piston 19 is connected with a fluid passage in the hydraulic circuit. Atmospheric chamber 24 is opened to the outside through a vent hole 25 opened in the cover member 21.

Figure 3:
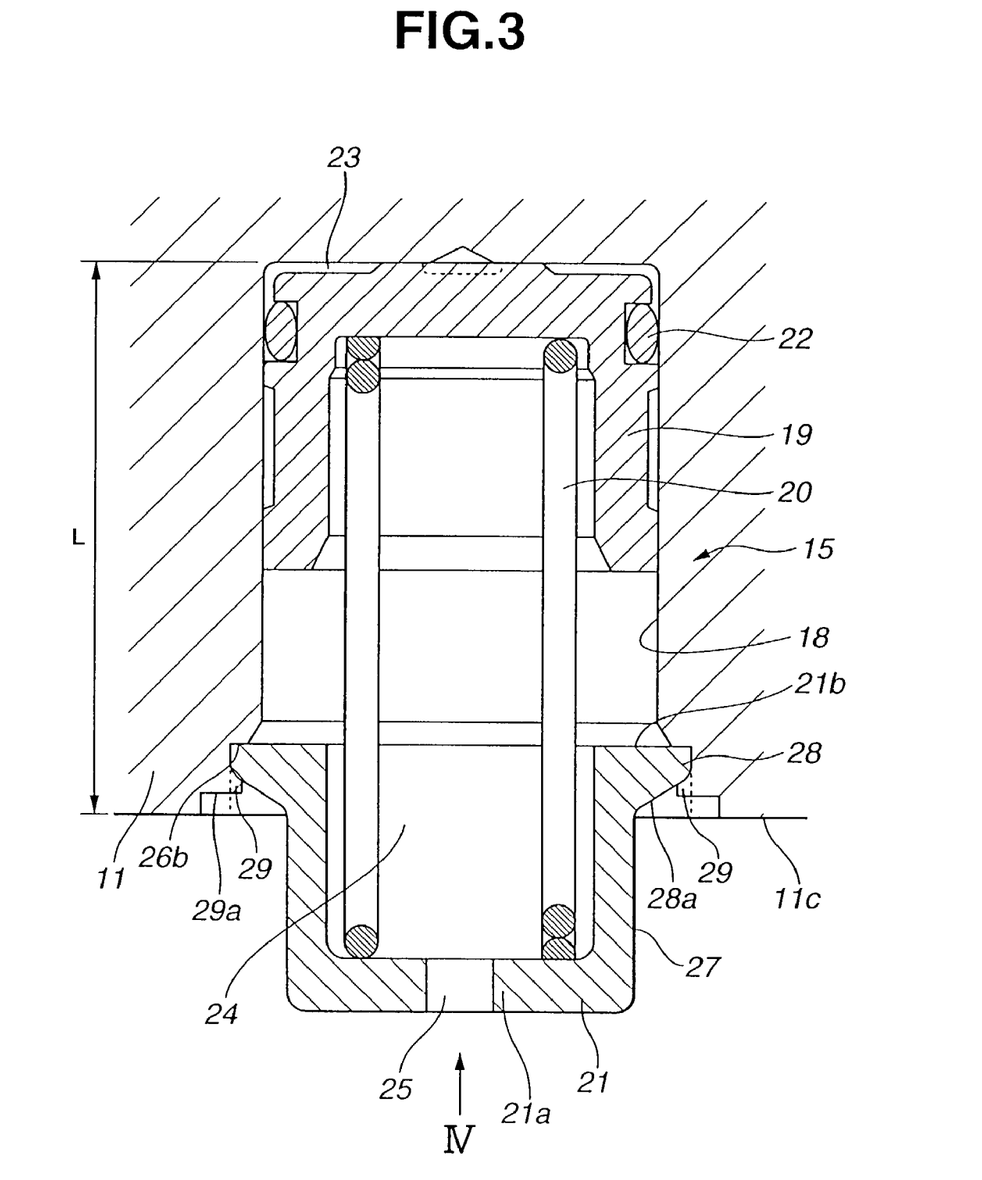
FIG. 3 is an enlarged sectional view of one reservoir portion in the brake fluid pressure control unit of FIG. 2.
Figure 5:
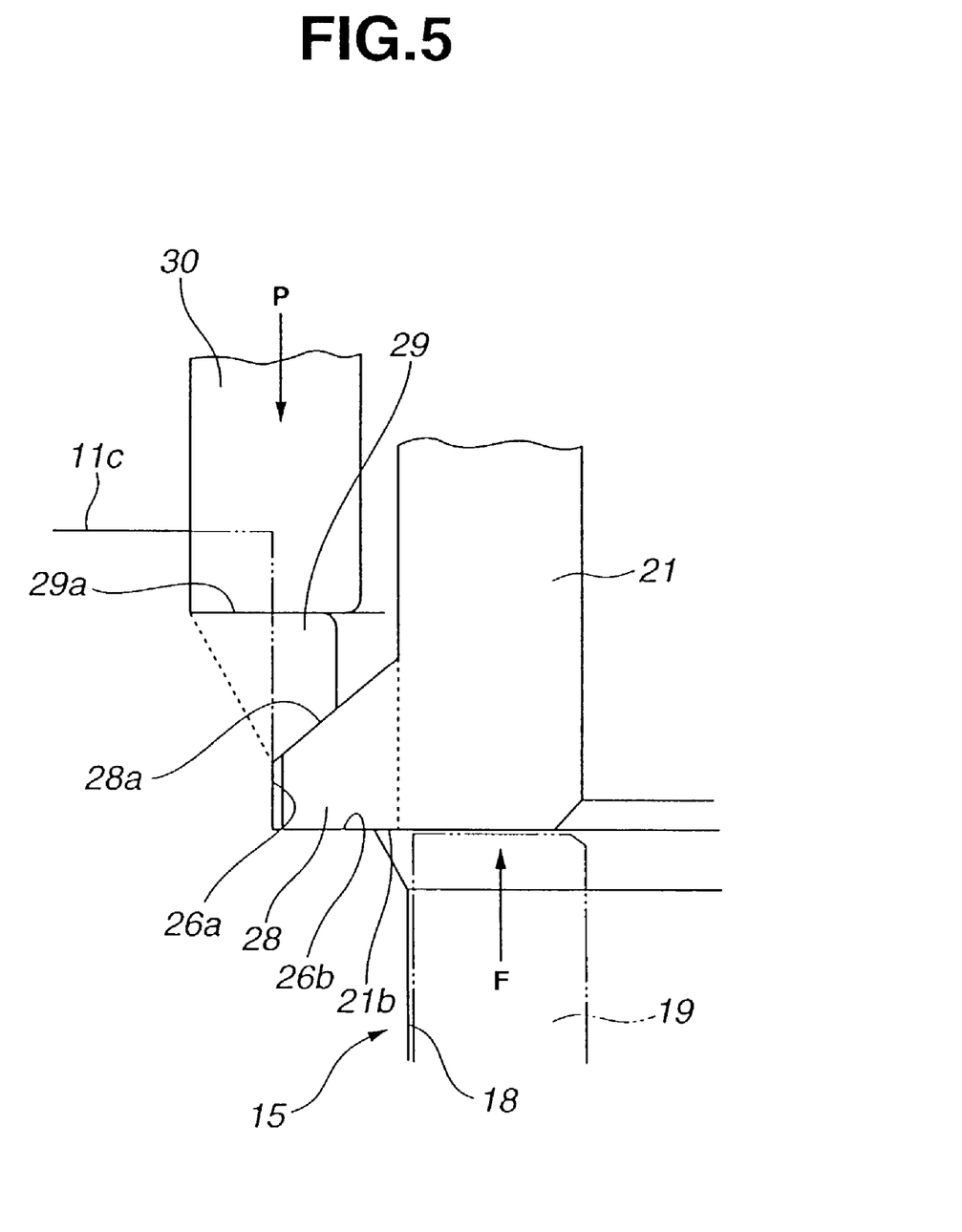
FIG. 5 is a schematic view for illustrating a joining structure in the reservoir portion of FIG. 4.

An annular recess 26 is depressed (upward as viewed in FIG. 3) below the lower outside surface 11c of base block 11, around the open end of each cylinder bore 18 as shown in FIG. 3. Annular recess 26 is defined by an inside cylindrical surface 26a and an annular shoulder surface 26b facing away from the bottom end of cylinder bore 18, as shown in FIG. 5. Cover member 21 is fixed to the annular shoulder surface 26b by fixing means for pressure welding. In this example, annular shoulder surface 26b is a flat surface to which the axis of the cylinder bore 18 is perpendicular.

Cover member 21 for each cylinder bore 18 includes a cylindrical wall 27 extending from a first end to a second end, a circular flat end wall 21a closing the first end, and an annular outward flange 28 formed around the second end of cylinder wall 27. Cylinder wall 27 projects from the lower side of base block 11 and terminates at the end wall 21a. Vent hole 25 is formed at the center of circular flat end wall 21a. Each cover member 21 of this example is a forging or product formed by forging. Spring 20 is disposed between end wall 21a of cover member 21 and piston 19, as shown in FIG. 3.

As shown in FIG. 3, cover member 21 of this example has a flat annular end surface 21b facing toward the bottom end of cylinder bore 18. Outward flange 28 of cover member 21 further includes an annular tapering surface 28a. Outward flange 28 is bounded between flat annular end surface 21b and annular taper surface 28a. Therefore, outward flange 28 is tapered to the outer circumferential end so that the thickness of outward flange 28 decreases gradually toward the outer circumferential end of outward flange 28. Annular taper surface 28a of this example is a conical surface extending from a corner formed, in the shape of a smaller circle, between annular taper surface 28a and outside cylindrical surface of cylinder wall 27, to an edge formed, in the shape of a larger circle, between annular taper surface 28a and the outer circumferential end of outward flange 28.

The flat annular end surface 21b of cover member 21 projects radially inward beyond the inside cylindrical surface of cylinder bore 18, as shown in FIG. 3. An outer region of the flat annular end surface 21b projecting outward beyond the cylinder bore 18 is in contact with the flat annular shoulder surface 26b of base block 11. An inner region of the flat annular end surface 21b confronts piston 19 in the cylinder bore 18, and abuts against piston 19 to prevent excessive displacement of piston 19 when piston 19 moves downward as viewed in FIG. 3 beyond a preset stroke limit. The inside diameter of cylinder wall 27 of cover member 21 is smaller than the inside diameter of cylinder bore 18. Cylinder wall 27 is coaxial with cylinder bore 18, as shown in FIG. 3.

Figure 4:
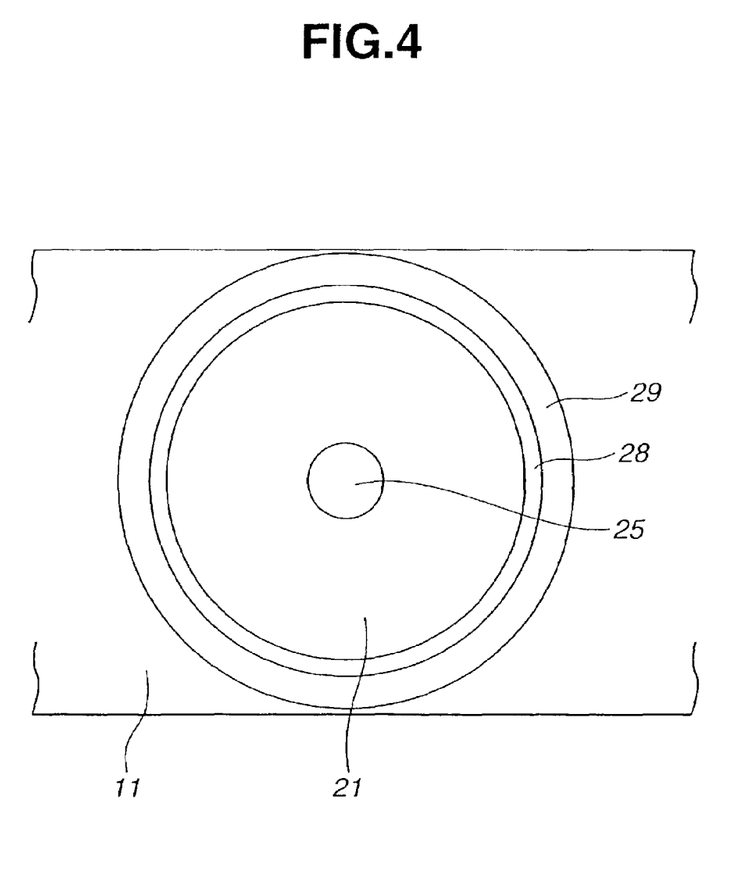
FIG. 4 is a view of the reservoir portion of FIG. 3, as viewed from a direction indicated by an arrow IV.

An annular fixing portion 29, as shown in FIGS. 3 and 4, is a portion of base block 11 deformed plastically to fix outward flange 28 of cover member 21 to base block 11. Annular fixing portion 29 projects radially inward, and the outward flange 28 is fixedly clamped between annular fixing portion 29 and annular shoulder surface 26b of base block 11. Annular fixing portion 29 is formed by deforming the brim of annular recess 26 with a punch 30 having a flat end, as shown in FIG. 5. In this case, the tapered surface 28a of outward flange 28 of cover member 11 helps smooth deformation of annular fixing portion 29. Cover member 21 thus fixed by staking to annular recess 26 of base block 11 is able to bear the reaction force of coil spring 20 and limit the axial movement of piston 19 securely.

In the thus-constructed fluid pressure control unit, reservoirs 15 are located on the side of base block which is the lower side between first and second base faces 11a and 11b upright when installed in a vehicle. However, even if the lower side of the fluid pressure control unit is contaminated with brake fluid or water, cover members 21 of aluminum material function to protect reservoirs 15 and prevent electrolytic corrosion between base block 11 and cover members 21. This embodiment of the present invention can prevent corrosion of the fluid pressure control unit without the need for size increase or cost increase due to additional surface treatment.

Work hardening resulting from forging is effective for improving the rigidity and strength of cover members 21, and for reducing the required thickness of cover members 21. Depth L of cylinder bores 18 can be reduced by using cover members 21 projecting from base block 11, and hence base block 11 can be reduced in height. Therefore, this embodiment is advantageous in compactness of the fluid pressure control unit and prevention of interference with adjacent components in a vehicle.

Piston 19 is slidable only in the cylinder bore 18 of base block 11, and cover member 21 provides an additional axial length for spring 20. Therefore, it is possible to reduce the wall thickness and/or height of cover member 21 and reduce the interference with adjacent component parts. When insulator rubber is interposed between the lower side of base block 11 and a mount portion in an engine compartment, the projecting portions of cover member 11 can be compactly received in space in the insulator rubber.

Figure 6A:
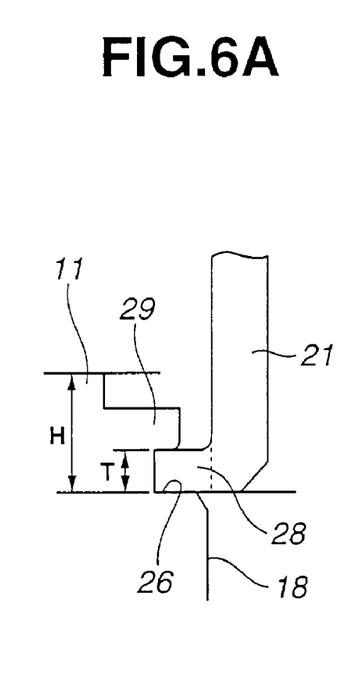
FIGS. 6A, 6B and 6C are schematic views illustrating the joining structure of the reservoir portion of FIG. 4.
Figure 6B:
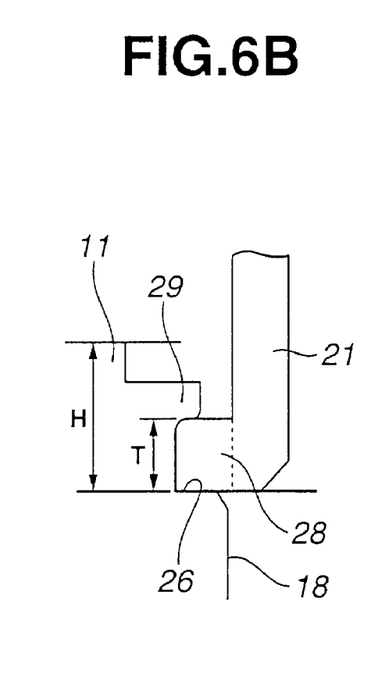
Figure 6C:
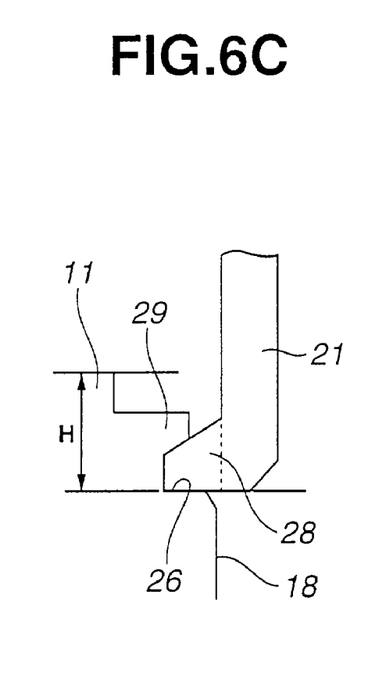

Outward flange 28 of cover member 21 receives a load F from piston 19 as shearing load with a portion shown by broken lines in FIG. 5. Cover member 21 if made of iron-base alloy can withstand the load F sufficiently with a thin-wall flange 28 as shown in FIG. 6A. However, cover member 21 of aluminum material can bear the load only with a thick wall flange 28 as shown in FIG. 6B, resulting in the need for increasing the height H (or depth) of annular recess 26, as shown in FIG. 6B. In the case of tapered flange 28a according to the embodiment of the present invention, by contrast, the load F can be supported with the inner thickest region of flange 28a as shown by broken line in FIG. 6C. Tapered outward flange 28a of aluminum material according to this embodiment can withstand the load F as the shearing load without the need for increasing the height or depth H of annular recess 26. The aluminum material may be pure aluminum or aluminum alloy.

Figure 7:
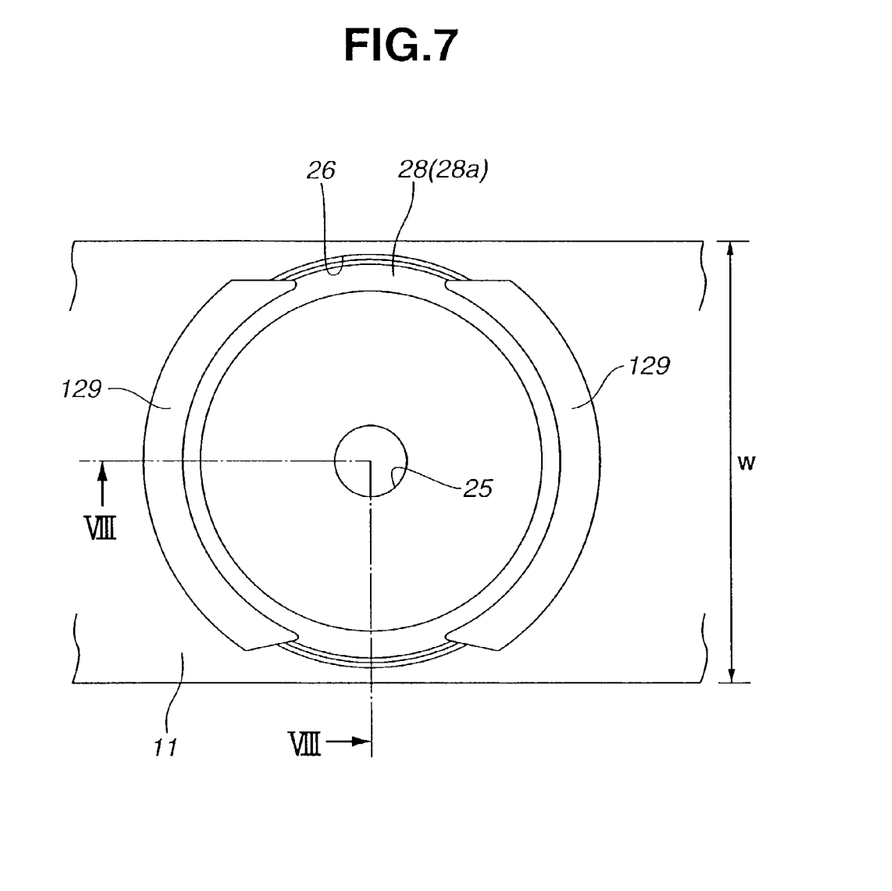
FIG. 7 is a back side view similar to FIG. 4, but showing a reservoir portion in another example.
Figure 8:
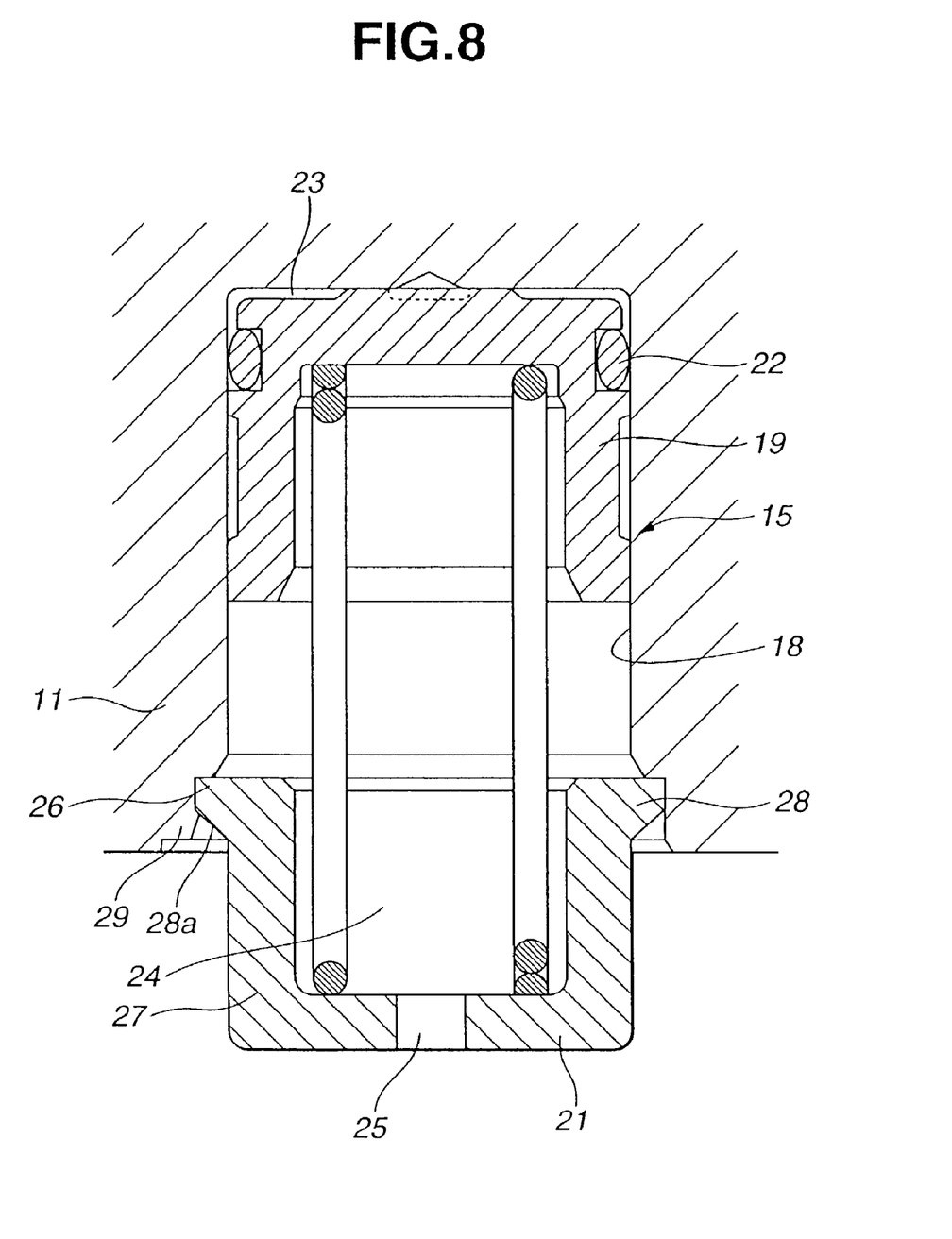
FIG. 8 is a sectional view taken across a line VIII-VIII in FIG. 7 similar to FIG. 3, but showing a reservoir portion in another example.

FIGS. 7 and 8 show a variation of the fixing portion of base block 11. In this variation, the fixing portion is composed of a plurality of fixing portions 129 which are two in number in the example of FIGS. 7 and 8. Fixing portions 129 extends in the shape of an arc, around the annular recess 26. In the example shown in FIG. 7, the first and second arc-shaped fixing portions 129 confront each other diametrically across the cylinder bore 18, and the first and second arc-shaped fixing portions 129 are spaced from each other in the widthwise direction of base block 11. The first and second arc-shaped fixing portions 129 are separated by a first plain region having no fixing portion on the upper side as viewed in FIG. 7 and a second plain region having no fixing portion on the lower side. The first and second plain regions formed with no fixing portions are located at diagonally opposite positions adjacent, respectively, to base block face 11a and 11b, as shown in FIG. 7. This arrangement can help protect the first and second base block faces 11a and 11b for supporting other large-sized components from strain caused by staking operations with punch (30), and make it possible to reduce the width W of base block 11 as measured between both faces 11a and 11b. The configuration shown in FIGS. 7 and 8 requires staking only for parts of the circumference, and hence facilitates the staking operation to the advantage of manufacturing cost.

Figure 9:
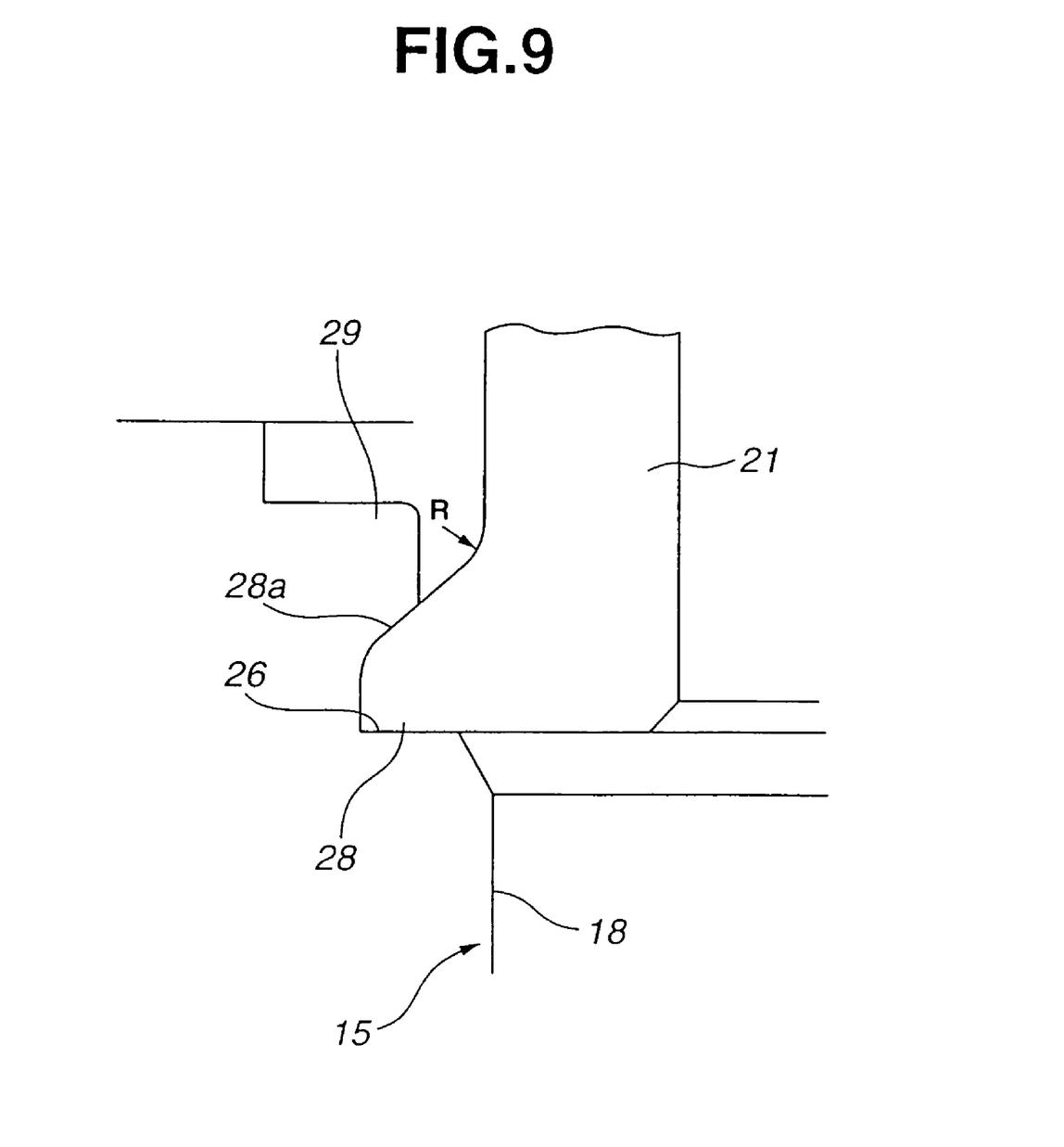
FIG. 9 is an enlarged section showing a joining structure in still another example.

FIG. 9 shows another variation. In this example, cover member 21 has a rounded corner having an arc-shaped cross section R, formed between annular taper surface 28a of tapered outer flange 28 and outside cylindrical surface of cylinder wall 27, and a rounded edge having an arc-shaped cross section R, formed between annular taper surface 28a and the outer circumferential end of outward flange 28. This design can prevent stress concentration at outward flange 28, and improve the strength of cover member 21.

This application is based on prior Japanese Patent Applications No. 2001-127632 filed on Apr. 25, 2001 and No. 2002-074048 filed in Japan on Mar. 18, 2002. The entire contents of these prior Japanese Patent Applications are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A brake fluid pressure control unit for a vehicle, the brake fluid pressure control unit comprising:
   a base block of aluminum material, formed with a cylinder bore extending axially from a bottom end to an open end, the base block including a fixing portion to fix a cover member to the base block;
   a piston received slidably in the cylinder bore and shaped to divide the inside of the cylinder bore into a fluid chamber and an atmospheric chamber;
   a bias member disposed between the piston and the cover member, and arranged to urge the piston toward the bottom end of the cylinder bore; and
   the cover member fixed to the base block to cover the open end of the cylinder bore, and made of aluminum material,
   wherein the cover member includes a flange, the flange including a tapered surface projecting outward in a direction toward the bottom end such that a diameter of an outer portion of the tapered surface toward the bottom end is greater than a diameter of an inner portion of the tapered surface, wherein a thickness of the flange at the inner portion of the tapered surface,
   wherein the fixing portion of the base block and the tapered surface of the flange are staked,
   wherein the base block includes a substantially flat annular shoulder surface facing away from the bottom end of the cylinder bore; and
   wherein the cover member includes a substantially flat annular cover end surface facing toward the bottom end of the cylinder bore, the annular cover end surface including a substantially flat outer region abutting on the annular shoulder surface of the base block and a substantially flat inner region projecting from the outer region radially inward beyond the annular shoulder surface into the cylinder bore and facing axially toward the piston.

2. The brake fluid pressure control unit as claimed in claim 1, wherein the cover member is a forging.

3. The brake fluid pressure control unit as claimed in claim 1, wherein the cover member comprises an end wall and a cylindrical wall projecting from the base block, to the end wall.

4. The brake fluid pressure control unit as claimed in claim 1, wherein the fixing portion is deformed by a staking process.

5. The brake fluid pressure control unit as claimed in claim 4, wherein the fixing portion of the base block extends around the open end of the cylinder bore, in the form of an annular inward flange.

6. The brake fluid pressure control unit as claimed in claim 4, wherein the fixing portion of the base block comprises a plurality of separate portions arranged around the open end of the cylinder bore, and spaced from one another.

7. The brake fluid pressure control unit as claimed in claim 1, wherein the base block comprises:
   a first side face to which a first component is fixed; and
   a second side face to which a second component is fixed;
   wherein the fixing portion includes first and second fixing portions each extending around the open end of the cylinder bore from a first end to a second end, the first ends of the first and second fixing portions being separated by a first plain region adjacent to the first side face, the second ends of the first and second fixing portions being separated by a second plain region adjacent to the second side face.

8. The brake fluid pressure control unit as claimed in claim 1, wherein the cover member is in direct contact with the base block.

9. The brake fluid pressure control unit as claimed in claim 1, wherein the flange has a solid construction and has an inner surface substantially parallel to the cylinder bore.

10. The brake fluid pressure control unit as claimed in claim 1, wherein the cover is formed with a vent hole opening into the atmospheric chamber.

11. The brake fluid pressure control unit as claimed in claim 1, wherein the piston and the cover member are spaced apart axially from each other by the bias member.

12. The brake fluid pressure control unit as claimed in claim 1, wherein the piston includes a piston end wall defining the fluid chamber between the bottom end of the cylinder bore and the piston end wall of the piston, and a cylindrical wall extending axially from the piston end wall to an annular piston end surface facing away from the piston end wall so that the piston is bounded axially between the piston end wall and the annular piston end surface; and
   wherein the cover member includes a cover end wall and a cylindrical wall extending axially from the cover end wall to the annular cover end surface that axially confronts the annular piston end surface of the piston.

13. The brake fluid pressure control unit as claimed in claim 12, wherein the annular piston end surface of the piston is spaced apart from the annular cover end surface of the cover member toward the bottom end of the cylinder bore when the piston is at a position closest to the bottom end of the cylinder bore.

14. A brake fluid pressure control unit for a vehicle, the brake fluid pressure control unit comprising:
   a base block of aluminum material, formed with a cylinder bore extending from a bottom end to an open end;

a piston received slidably in the cylinder bore and shaped to divide the inside of the cylinder bore into a fluid chamber and an atmospheric chamber;

a bias member disposed between the piston and a cover member, and arranged to urge the piston toward the bottom end of the cylinder bore; and the cover member fixed to the base block to cover the open end of the cylinder bore, and made of aluminum material, wherein the base block comprises a fixing portion to fix the cover member to the base block by staking, wherein the cover member comprises an outward flange projecting outward to an outer end and having a tapered surface sloping toward the outer end of the outward flange so that a thickness of the outward flange, in a direction from an inner portion of the outward flange to the outer end, gradually becomes smaller and the fixing portion of the base block is a portion deformed onto the outward flange of the cover member, wherein the base block has an annular recess around the open end of the cylinder bore and depressed from an outside surface of the base block, the outward flange of the cover member is received in the annular recess, wherein the base block comprises an annular shoulder surface facing away from the bottom end of the cylinder bore, and an inside cylindrical surface surrounding the annular shoulder surface and bounding the annular recess with the annular shoulder surface, and wherein the cover member comprises an annular end surface facing toward the bottom end of the cylinder bore, the annular end surface including an outer region abutting on the annular shoulder surface of the base block and an inner region projecting radially into the cylinder bore and facing axially toward the piston.

15. The brake fluid pressure control unit as claimed in claim 14, wherein the fixing portion of the base block extends around the open end of the cylinder bore, in the form of an annular inward flange.

16. The brake fluid pressure control unit as claimed in claim 14, wherein the fixing portion of the base block comprises a plurality of separate portions arranged around the open end of the cylinder bore, and spaced from one another.

17. The brake fluid pressure control unit as claimed in claim 14, wherein the base block further comprises an annular depressed surface which is depressed below the outside surface of the base block and which extends radially over the outward flange of the cover member.

18. The brake fluid pressure control unit as claimed in claim 14, wherein the fixing portion of the base block includes a radial inner end located on the taper surface sloping toward the outer end of the outward flange.

19. The brake fluid pressure control unit as claimed in claim 14, wherein the inner region of the annular end surface of the cover member projects radially inwards into the cylinder bore and abuts against the piston to limit axial movement of the piston.

20. The brake fluid pressure control unit as claimed in claim 14, wherein the outward flange has a solid construction and has an inner surface substantially parallel to the cylinder bore.

21. The brake fluid pressure control unit as claimed in claim 14, wherein the cover is formed with a vent hole opening into the atmospheric chamber.

22. The brake fluid pressure control unit as claimed in claim 14, wherein the piston is supported slidably only by the base block within the cylinder bore so that the piston remains apart axially from the cover member during sliding movement of the piston in the cylinder bore.

23. The brake fluid pressure control unit as claimed in claim 14, wherein the cover member comprises an end wall and a cylindrical wall projecting from the outside surface of the base block, to the end wall.

24. The brake fluid pressure control unit as claimed in claim 23, wherein the cover member comprises a rounded corner between the tapered surface of the outward flange and an outside cylindrical surface of the cylindrical wall, and a rounded edge between the tapered surface of the outward flange and the outer end of the outward flange.

25. A brake fluid pressure control unit for a vehicle, the brake fluid pressure control unit comprising:

a base block of aluminum material, formed with a cylinder bore extending axially from a bottom end to an open end opened in a lower outside surface of the base block, and including an annular recess formed along the open end of the cylinder bore and extending radially into the base block;

a piston received slidably in the cylinder bore;

a spring arranged to urge the piston toward the bottom end of the cylinder bore; and a cover member of aluminum material, including an end wall supporting one end of the spring disposed between the piston and the cover member, and an outward flange received in the annular recess of the base block and fixed to the base block, wherein the outward flange includes a tapered surface projecting outward in a direction toward the bottom end such that a diameter of an outer portion of the tapered surface toward the bottom end is greater than a diameter of an inner portion of the tapered surface, wherein the base block includes a substantially flat annular shoulder surface facing away from the bottom end of the cylinder bore; and wherein the cover member includes a substantially flat annular end surface facing toward the bottom end of the cylinder bore, the annular end surface including a substantially flat outer region abutting on the annular shoulder surface of the base block and a substantially flat inner region projecting radially into the cylinder bore and facing axially toward the piston.

26. The brake fluid pressure control unit as claimed in claim 25, wherein the outward flange has a solid construction and has an inner surface substantially parallel to the cylinder bore.

27. The brake fluid pressure control unit as claimed in claim 25, wherein the annular recess includes a substantially flat shoulder surface formed facing away from the bottom end of the cylinder bore, and wherein the base block has a fixing portion that fixes the outward flange to the base block, the fixing portion having an outer surface substantially parallel to the shoulder surface.

28. The brake fluid pressure control unit as claimed in claim 25, wherein the piston is supported slidably only by the base block within the cylinder bore so that the piston remains apart axially from the cover member during sliding movement of the piston in the cylinder bore.

29. The brake fluid pressure control unit as claimed in claim 25, wherein the cover member further includes a cylindrical wall projecting from the lower outside surface of the base block.

30. A brake fluid pressure control unit for a vehicle, the brake fluid pressure control unit comprising:

a base block of aluminum material, formed with a cylinder bore extending from a bottom end to an open end;

a piston received slidably in the cylinder bore and shaped to divide the inside of the cylinder bore into a fluid chamber and an atmospheric chamber;

a bias member disposed between the piston and a cover member, and arranged to urge the piston toward the bottom end of the cylinder bore;

the cover member being fixed to the base block to cover the open end of the cylinder bore, the cover member formed with a vent hole opening into the atmospheric chamber, and made of the aluminum material; and fixing means for fixing the cover member to the base block by staking, the fixing means including a first portion of aluminum material formed integrally in the base block and including a radial annular recessed portion with a substantially flat shoulder portion, and a second portion of aluminum material which is formed integrally in the cover member, the second portion being directly clamped by the first portion of the base block against the annular recessed portion, wherein the base block includes a substantially flat annular shoulder surface facing away from the bottom end of the cylinder bore;

wherein the cover member includes a substantially flat annular end surface facing toward the bottom end of the cylinder bore, the annular end surface including a substantially flat outer region abutting on the annular shoulder surface of the base block and a substantially flat inner region projecting radially into the cylinder bore and facing axially toward an end of the piston; and wherein the first portion of the fixing means formed integrally in the base block comprises a plurality of separate portions, non-continuous from one another, arranged around the open end of the cylinder bore, and spaced from one another.

31. The brake fluid pressure control unit as claimed in claim 30, wherein the piston is supported slidably only by the base block within the cylinder bore so that the piston remains apart axially from the cover member during sliding movement of the piston in the cylinder bore.

32. The brake fluid pressure control unit as claimed in claim 30, wherein each of the separate portions is an annular projection projecting radially inward around the open end of the cylinder bore, and wherein the separate portions are spaced from one another with intervening gaps so that the separate portions and the gaps are arranged alternately around the open end of the cylinder bore.

33. The brake fluid pressure control unit as claimed in claim 30, wherein the separate portions are arc-shaped portions, and are spaced circumferentially from one another by a plurality of plain regions having no fixing portion so that the separate portions and the plain regions are arranged alternately around the open end of the cylinder bore.

34. The brake fluid pressure control unit as claimed in claim 33, wherein the plain regions are arc-shaped, and the separate portions and the plain regions are arranged alternately in a circle around the open end of the cylinder bore.

35. The brake fluid pressure control unit of claim 34, further comprising a pump driving motor mounted to a first facing of the base block and the cylinder bore formed in a second facing of the base block, wherein the plain regions are positioned closer to the first facing of the base block than the separate portions.

36. The brake fluid pressure control unit as claimed in claim 30, wherein the base block includes an outside surface in which the cylinder bore is formed, and wherein the fixing means is provided in an annular region extending around the open end of the cylinder bore between the outside surface of the base block and the second portion of the cover member, the separate portions being spaced circumferentially from one another in the annular region by a plurality of plain regions, and the second portion of the cover member being clamped by the separate portions and not being clamped by the plain regions.

37. The brake fluid pressure control unit as claimed in claim 30, wherein each of the separate portions is a plastically deformed portion, and an annular region surrounding the open end of the cylinder bore being deformed only at the separate portions without being deformed entirely around the open end.

38. A brake fluid pressure control unit for a vehicle, the brake fluid pressure control unit comprising:

a piston received slidably in a bore extending axially from a first bore end to a second bore end;

a coil spring disposed in the bore, the coil spring including a first spring end and a second spring end abutting against the piston;

a base block of aluminum material, including an outside surface, the bore being formed in the base block, the first bore end of the bore being open to an outside surface of the base block, the base block further comprising a shoulder surface formed around the bore and extending radially into the base block, and a fixing portion; and a cover member of aluminum material, fixed to the base block to cover the first bore end opening to the outside surface of the base block, the cover member including an end wall supporting the first spring end of the coil spring, and an outward flange clamped between the shoulder surface and the fixing portion of the base block of aluminum material, wherein the outward flange is formed at one end of the cover member, and bounded by an annular end surface facing toward the piston, the cover member extends axially from the end wall toward the piston and terminates at the annular end surface, and the annular end surface of the cover member abuts on the shoulder surface of the base block and projects radially inward in the bore; and wherein the fixing portion of the base block comprises a plurality of separate portions, non-continuous from one another, arranged around the first bore end of the bore, and spaced from one another.

39. The brake fluid pressure control unit as claimed in claim 38, wherein the outside surface of the base block is a lower surface which faces downward when the base block is installed in a vehicle; and the cover member projects downward from the lower surface of the base block such that the cover member is exposed to the outside of the base block.

40. The brake fluid pressure control unit as claimed in claim 38, wherein the cover member projects outward from the outside surface of the base block such that a majority of the cover member projects outwards from the outside surface of the base block.

41. The brake fluid pressure control unit as claimed in claim 38, wherein the cover member extends from a first end defined by the end wall and located outside the base block, to a second end defined by the outward flange and located inside the base block, and the cover member projects outward from the outside surface of the base block so that a distance between the first end of the cover member and the outside surface of the base block is greater than a distance between the second end of the cover member and the outside surface of the base block.

42. The brake fluid pressure control unit as claimed in claim 38, wherein the outward flange has a greater outer diameter than a wall of the cover member projecting outward from the outside surface of the base block.

43. The brake fluid pressure control unit as claimed in claim 38, wherein the piston and the cover member are spaced apart axially from each other by the coil spring.

44. The brake fluid pressure control unit as claimed in claim 38, wherein the piston includes a piston end wall, and a cylindrical wall extending axially from the piston end wall to an annular piston end surface facing away from the piston end wall so that the piston is bounded axially between the piston end wall and the annular piston end surface; and the annular end surface of the cover member axially faces toward the annular piston end surface of the piston and limits axial movement of the piston.

45. The brake fluid pressure control unit as claimed in claim 38, wherein the base block includes an inside cylindrical surface defining the bore and extending axially from a first axial end to a second axial end in the shape of a right circular cylinder so that an inside diameter of the inside cylindrical surface is constant from the first axial end to the second axial end; and
wherein an axial length of the inside cylindrical surface between the first axial end and the second axial end is longer than an axial length of the piston, so that the piston can reciprocate axially between the first and second axial ends of the inside cylindrical surface of the base block.

46. The brake fluid pressure control unit as claimed in claim 38, wherein the cover member projects outward from the outside surface of the base block.

47. The brake fluid pressure control unit as claimed in claim 38, wherein each of the separate portions is an annular projection projecting radially inward around the first bore end of the bore, and
wherein the separate portions are spaced from one another with intervening gaps so that the separate portions and the gaps are arranged alternately around the first bore end of the bore.

48. The brake fluid pressure control unit as claimed in claim 38, wherein the separate portions are arc-shaped portions, and are spaced circumferentially from one another by a plurality of plain regions having no fixing portion so that the separate portions and the plain regions are arranged alternately around the first bore end of the bore.

49. The brake fluid pressure control unit as claimed in claim 48, wherein the plain regions are arc-shaped, and the separate portions and the plain regions are arranged alternately in a circle around the first bore end of the bore.

50. The brake fluid pressure control unit of claim 49, further comprising a pump driving motor mounted to a first facing of the base block and the bore formed in a second facing of the base block, wherein the plain regions are positioned closer to the first facing of the base block than the separate portions.

51. The brake fluid pressure control unit as claimed in claim 38, wherein the base block includes an outside surface in which the bore is formed, and
wherein the fixing portion is provided in an annular region extending around the first bore end of the bore between the outside surface of the base block and the outward flange of the cover member, the separate portions of the fixing portion being spaced circumferentially from one another in the annular region by a plurality of plain regions, and the outward flange of the cover member being clamped by the separate portions and not being clamped by the plain regions.

52. The brake fluid pressure control unit as claimed in claim 38, wherein each of the separate portions is a plastically deformed portion, and an annular region surrounding the first bore end of the bore being deformed only at the separate portions without being deformed entirely around the first bore end.

53. The brake fluid pressure control unit as claimed in claim 52, wherein the separate portions are formed by staking.

54. A method of manufacturing a brake fluid pressure control unit for a vehicle, the brake fluid pressure control unit comprising:
a base block of aluminum material, formed with a cylinder bore extending axially from a bottom end to an open end;
a piston received slidably in the cylinder bore and shaped to divide the inside of the cylinder bore into a fluid chamber and an atmospheric chamber;
a cover member extending axially from an open end to a closed end, having an outward flange with a tapered surface projecting radially outward in a direction toward the bottom end of the cylinder bore, formed with a vent hole opening into the atmospheric chamber, and made of aluminum material;
a bias member disposed between the piston and the cover member and arranged to urge the piston toward the bottom end of the cylinder bore;
the manufacturing method comprising:
forming an annular recessed receiving portion, for receiving the outward flange of the cover member, extending radially into the base block around the open end of the cylinder bore;
setting the outward flange formed at the open end of the cover member of aluminum material in the receiving portion of the base block of aluminum material so that an annular end surface of the cover member defining the outward flange projects in the cylinder bore and axially faces toward an end of the piston; and
fixing the cover member to the base block by deforming the receiving portion of the base block plastically to directly clamp the outward flange of the cover member.

55. The method of manufacturing as claimed in claim 54, wherein the step of forming a receiving portion further comprises forming an annular shoulder portion in the annular recessed receiving portion and a fixing portion that projects radially inward towards a center of the cylinder bore, and
wherein the step of fixing the cover member further comprises deforming the fixing portion to directly clamp the outward flange between the annular shoulder portion and the fixing portion.

* * * * *